USOO5626906A

United States Patent [19]
Summerfelt et al.

[11] Patent Number: 5,626,906
[45] Date of Patent: May 6, 1997

[54] ELECTRODES COMPRISING CONDUCTIVE PEROVSKITE-SEED LAYERS FOR PEROVSKITE DIELECTRICS

[75] Inventors: Scott R. Summerfelt; Howard R. Beratan, both of Dallas, Tex.

[73] Assignee: Texas Instruments Incorporated, Dallas, Tex.

[21] Appl. No.: 604,268

[22] Filed: Feb. 21, 1996

Related U.S. Application Data

[63] Continuation of Ser. No. 283,468, Aug. 1, 1994, abandoned.

[51] Int. Cl.$^6$ ............................... B05D 5/12; B05D 1/36
[52] U.S. Cl. ........................ 427/126.3; 427/79; 427/99; 427/419.3
[58] Field of Search ................... 427/126.3, 79, 427/99, 419.3

[56] References Cited

U.S. PATENT DOCUMENTS

| | | | |
|---|---|---|---|
| 4,809,225 | 2/1989 | Dimmler et al. | 365/145 |
| 4,853,983 | 8/1989 | Grant | 4/251 |
| 4,873,644 | 10/1989 | Fujii et al. | 364/478 |
| 4,888,733 | 12/1989 | Mobley | 365/145 |
| 4,893,272 | 1/1990 | Eaton, Jr. et al. | 365/145 |
| 4,910,708 | 3/1990 | Eaton, Jr. et al. | 365/145 |
| 4,914,627 | 4/1990 | Eaton, Jr. et al. | 365/145 |
| 4,918,654 | 4/1990 | Eaton, Jr. et al. | 365/145 |
| 4,982,309 | 1/1991 | Shepherd | 361/321 |
| 5,053,917 | 10/1991 | Miyasaka et al. | 361/321 |
| 5,079,200 | 1/1992 | Jackson | 501/136 |
| 5,122,923 | 6/1992 | Matsubara et al. | 316/321 |
| 5,191,510 | 3/1993 | Huffman | 361/313 |

FOREIGN PATENT DOCUMENTS

0557937A1  2/1993  European Pat. Off. .

OTHER PUBLICATIONS

Cheung et al, Appl. Phys. Lett. 60 (25) Jun. 1992, pp. 3180–3182.Tiwari et al, Appl. Phys. Lett. 64(5) Jan. 1994, pp. 634–636.
Miura et al, Appl. Phys. lett. 53 (20) Nov. 1988 pp. 1967–1969.
Gao et al, J. Appl. Phys. 71(5) Mar. 1992, pp. 2333–2337.
G.F. McLane, L. Casas, J.S. Reid, E. Kolawa, and M.-A. Nicolet, "Reactive Ion Etching of Ta–Si–N Diffusion Barrier Material in $CF_4+O_2$," *Journal of Vacuum Science and Technology B*, vol. 12, No. 4, Jul./Aug. 1994, p. 2352–2355, from the 1994 MRS spring mtg.
A.F. Tasch, Jr. and L.H. Parker, "Memory Cell and Technology Issues for 64 and 256–Mbit One–Transistor Cell MOS DRAMs," *Proceedings of the IEEE*, vol. 77, No. 3, Mar. 1989, pp. 374–388.
K. Takemura, et al., "Barrier Mechanism of Pt/Ta and Pt/Ti Layers for $SrTiO_3$ Thin Film Capacitors on Si," *4th Inter. Symp. on Integrated Ferroelectrics*, C52 (1992). No page number.

(List continued on next page.)

*Primary Examiner*—Roy V. King
*Attorney, Agent, or Firm*—Brian A. Carlson; Richard A. Stoltz; Richard L. Donaldson

[57] ABSTRACT

A preferred embodiment of this invention comprises a perovskite-seed layer (e.g. calcium ruthenate 40) between a conductive oxide layer (e.g. ruthenium oxide 36) and a perovskite dielectric material (e.g. barium strontium titanate 42), wherein the perovskite-seed layer and the conductive oxide layer each comprise the same metal. The metal should be conductive in its metallic state and should remain conductive when partially or fully oxidized. Generally, the perovskite-seed layer has a perovskite or perovskite-like crystal structure and lattice parameters which are similar to the perovskite dielectric layer formed thereon. At a given deposition temperature, the crystal quality and other properties of the perovskite dielectric will generally be enhanced by depositing it on a surface having a similar crystal structure. Undesirable crystal structure formation will generally be minimized and lower processing temperatures may be used to deposit the perovskite dielectric layer. Another benefit of this electrode system is that the perovskite-seed layer should do little or no reduction of the perovskite dielectric layer.

21 Claims, 3 Drawing Sheets

OTHER PUBLICATIONS

T. Sakuma, S. Yamamichi, S. Matsubara, H. Yamaguchi, and Y. Miyasaka, "Barrier Layers for Realization of High Capacitance Density in SrTiO$_3$ Thin–Film Capacitor on Silicon," *Appl. Phys. Lett.*, 57 (23) 3 Dec. 1990, pp. 2431–2433.

M.–A. Nicolet, "Diffusion Barriers in Thin Films," *Thin Solid Films*, 52 (1978) 415–443.

M.–A. Nicolet, "Thin Film Diffusion Barrier for Metal–Semiconductor Contacts," *Materials Research Society*, 1987, pp. 19–26.

C.J. Brennan, "Characterization and Modelling of Thin–Film Ferroelectric Capacitors Using C–V Analysis," *Proc. 3rd Inter. Symp. on Integrated Ferroelectrics*, 354–363 (1991).

J.F. Scott, B.M. Melnick, C.A. Araujo, L.D. McMillan and R. Zuleeg, "D.C. Leakage Currents in Ferroelectric Memories," *Proc. 3rd Inter. Symp. on Integrated Ferroelectrics*, 176–184 (1991).

R. Waser and M. Klee, "Theory of Conduction and Breakdown in Perovskite Thin Films," *Proc. 3rd Inter. Symp. on Integrated Ferroelectrics*, 288–305 (1991).

P.D. Hren, H.N. Al–Shareef, S.H. Rou, A.I. Kingon, P. Buaud, and E.A. Irene, "Hillock Formation in Pt Films," *Proc. MRS*, 1992. no page number.

H.N. Al–Shareef, K.D. Gifford, P.D. Hren, S.H. Rou, O. Auciello, and A.I. Kingdon, "Bottom Electrodes for Ferroelectric Thin Films," 1992. no page number.

S. Saito and K. Kuramasu, "Plasma Etching of RuO$_2$ Thin Films," *Japn. J. Appl. Phys.*, vol. 31, 1992, pp. 135–138.

S.K. Dey and R. Zuleeg, "Processing and Parameters of Sol–Gel PZt Thin–Films for GaAs Memory Applications," *Ferroelectrics*, vol. 112, 1990, pp. 309–319.

C. Hanson, H. Beratan, R. Owen, M. Corbin, and S. McKenney, "Uncooled Thermal Imaging at Texas Instruments," *SPIE*, 1735, 17 (1992).

B. Kulwicki, A. Amin, H.R. Beratan, and C.M. Hanson, "Pyroelectric Imaging," *ISAF*, 92, (1992). no page number.

D.L. Polla, C.–P. Ye and T. Yamagawa, "Surface–Micromachined PbTiO$_3$ Pyroelectric Detectors," *Appl. Phys. Lett.* 59, 1991, pp. 3539–3541.

K.R. Bellur, H.N. Al–Shareef, S.H. Rou, K.D. Gifford, O. Auciello, and A.I. Kingon, "Electrical Characterization of Sol–Gel Derived PZT Thin Films," 1992. no page number.

S.D. Bernstein, T.Y. Wong, Y. Kisler, and R.W. Tustison, "Fatigue of Ferroelectric PbZr$_x$Ti$_y$O$_3$ Capacitors with Ru and RuO$_x$ Electrodes," *J. Mat. Res.*, 8, 1993, pp. 12–13.

P.D. Hren, S.H. Rou, H.N. Al–Shareef, M.S. Ameen, O. Auciello, and A.I. Kingon, "Bottom Electrodes for Integrated Pb(Zr,Ti)O$_3$ Films", *Integrated Ferroelectrics*, vol. 2, No. 1–4, 1992. no page number.

K. Char, M.S. Colclough, T.H. Geballe, and K.E. Myers, "High T Superconductor–Normal–Superconductor Josephson Junctions Using CaRuO$_3$ as the Metallic Barrier," *Appl. Phys. Lett.*, 62, 1993, pp. 196–198.

Yasushiro Nishioka et al., "Time Dependent, Dielectric Breakdown Characteristics of Ta$_2$O$_5$/SiO$_2$ Double Layers," *Journal of the Electrochemical Society*, vol. 136, No. 3, Mar. 1989, pp. 872–873.

H. Jehn et al., "Surface and Interface Characterization of Heat–Treated (Ti,Al)N Coatings on High Speed Steel Substrates," *Thin Solid Films*, 153 (1987) 45–53.

Shigeaki Zaima et al., "Conduction Mechanism of Leakage Current in Ta$_2$O$_5$ Films on Si Prepared by LPCVD," *Journal of the Electrochemical Society*, vol. 137, No. 9, Sep. 1990, pp. 2876–2879.

Yasuhiro Nishioka et al., "Influence of SiO$_2$ at the Ta$_2$O$_5$/Si Interface on Dielectric Characteristics of Ta$_2$O$_5$ Capacitors," *Journal of Applied Physics*, 61 (6), Mar. 15, 1987, pp. 2335–2338.

Shigeaki Zaima et al., "Preparation and Properties of Ta$_2$O$_5$ Films by LPCVD for ULSI Application," *Journal of the Electrochemical Society*, vol. 137, No. 4, Apr. 1990, pp. 1297–1300.

G. Arit et al., "Dielectric Properties of Fine–Grained Barium Titanate Ceramics," *Journal of Applied Physics*, 58 (4), Aug. 15, 1985, pp. 1619–1625.

Yoichi Miyasaka et al., "Dielectric Properties of Sputter–Deposited BaTiO$_3$–SrTiO$_3$ Thin Films," *19990 IEEE 7th International Symposium on Applications of Ferroelectrics*, IEEE (1991), pp. 121–124.

Q.X. Jia et al., "Reactively Sputtered RuO$_2$ Thin Film Resistor With Near Zero Temperature Coefficient of Resistance," *Thin Solid Films*, 196 (1991) pp. 29–34.

T. Eimore, et al., "A Newly Designed Planar Stacked Capacitor Cell with High Dielectric Constant Film for 256 Mbit DRAM," *IEEE*, Dec. 5–8, 1993. no page number.

J.M., Molarius et al., "Tantalum–Based Encapsulants for Thermal Annealing of GaAs," *Journal of the Electrochemical Society*, vol. 138, No. 3, Mar. 1991, pp. 834–837.

H. Ichimura et al., "High–Temperature Oxidation of Ion–Plated TiN and TiAlN Films," *J. Mater. Res.*, vol. 8, No. 5, May 1993, pp. 1093–1100.

E. Kolawa, et al., "Amorphous Ta–Si–N Thin Films Alloys as Diffusion Barrier in Al/Si," *J. Vac. Sci. Technol.*, A 8 (3), May/Jun. 1990, pp. 3006–3010.

M.–A. Nicolet, et al., "Issues in Metal/Semiconductor Contact Design and Implementation," *Solar Cells*, 27 (1989) 177–189.

P.J. Pokela, et al., "Characterization of the AL/Ta–Si–N/Au Metallization," *Thin Solid Films*, 203 (1991) 259–266.

L.E. Halperin, "Silicon Schottky Barriers and p–n Junctions with Highly Stable Aluminum Contact Metallization," *IEEE Electron Device Letters*, vol. 12, No. 6, Jun. 1991, pp. 309–311.

E. Kolawa, "Sputtered Ta–Si–N Diffusion Barriers in Cu Metallizations for Si," *IEEE Electron Device Letters*, vol. 12, No. 6, Jun. 1991, pp. 321–323.

P.J. Pokela et al., "Amorphous Ternary Ta–Si–N Diffusion Barrier Between Si and Au," *J. Electrochem. Soc.*, vol. 138, No. 7, Jul. 7, 1991, pp. 2125–2129.

E. Kolawa, et al., "Amorphous Ta–Si–N Diffusion Barriers in Si/Al and Si/Cu Metallizations," *Applied Surface Science*, 53 (1991) 373–376.

P.J. Pokela et al., "Thermal Oxidation of Amorphous Ternary Ta$_{36}$Si$_{14}$N$_{50}$ Thin Films," *J. Appl. Phys.*, 70 (5), 1 Sep. 1991, pp. 2828–2832.

J.S. Reid et al., "Evaluation of Amorphous (Mo, Ta, W)–Si–N Diffusion Barriers for <Si>|Cu Metallizations," *Thin Solid Films*, 236 (1993) 319–324.

J.S. Chen et al., "Stable Pt/Ge/Au Ohmic Contact to n–GaAs with a Ta–Si–N Barrier," *Mat. Res. Soc. Symp. Proc.*, vol. 300, 1993, pp. 255–260.

J.S. Reid et al., "Ti–Si–N Diffusion Barriers Between Silicon and Copper," *IEEE Electron Device Letters*, vol. 15, No. 8, 1994, pp. 298–300.

ELECTRODES COMPRISING CONDUCTIVE PEROVSKITE-SEED LAYERS FOR PEROVSKITE DIELECTRICS

This application is a Continuation of application Ser. No. 08/283,468, filed Aug. 1, 1994, now abandoned.

CROSS-REFERENCES TO RELATED APPLICATIONS

The following related applications were filed concurrently with the instant application:

| Title | Inventors | Serial Number/ Filing Status |
|---|---|---|
| Improved High-Dielectric-Constant Material Electrodes Comprising Thin Platinum Layers | Summerfelt, Beratan, Kirlin, Gnade | 08/283,881 now U.S. Pat. No. 5,566,045 |
| Improved High-Dielectric-Constant Material Electrodes Comprising Thin Ruthenium Dioxide Layers | Summerfelt, Beratan, Kirlin, Gnade | 08/283,442 abandoned |
| Pre-oxidizing High-Dielectric-Constant Material Electrodes | Nishioka, Summerfelt, Park, Bhattacharya | 08/283,467 now U.S. Pat. No. 5,554,564 |
| High-Dielectric-Constant Material Electrodes Comprising Sidewall Spacers | Nishioka, Park, Bhattacharya, Summerfelt | 08/283,871 now U.S. Pat. No. 5,489,548 |
| A Conductive Amorphous-Nitride Barrier Layer for High-Dielectric-Constant Material Electrodes | Summerfelt | 08/283,441 pending |
| A Conductive Exotic-Nitride Barrier Layer for High-Dielectric-Constant Material Electrodes | Summerfelt | 08/283,873 now U.S. Pat. No. 5,504,041 |
| A Conductive Noble-Metal-Insulator-Alloy Barrier Layer for High-Dielectric-Constant Material Electrodes | Summerfelt, Nicolet, Reid, Kolawa | 08/283,454 pending |

The following previously filed applications are related to the instant application:

| Title | Inventors | Serial Number/ Filing Status |
|---|---|---|
| Improved Electrical Connections to Dielectric Materials | Gnade, Summerfelt | 08/604268 now U.S. Pat. No. 5,348,894 |
| Improved Electrical Connections to Dielectric Materials | Gnade, Summerfelt | 08/260,149 abandoned cont. pending |
| Lightly Donor Doped Electrodes for High-Dielectric-Constant Materials | Summerfelt, Beratan, Gnade | 08/040,946 abandoned continuation pending |
| Lightly Donor Doped Electrodes for High-Dielectric-Constant Materials | Summerfelt, Beratan, Gnade | 08/276,191 abandoned |
| Improved Electrode Interface for High-Dielectric-Constant Materials | Summerfelt, Beratan | 08/041,025 now U.S. Pat. No. 5,471,864 |

FIELD OF THE INVENTION

This invention generally relates to improving electrical connections to perovskite materials, such as in the construction of pyroelectric detectors.

BACKGROUND OF THE INVENTION

Without limiting the scope of the invention, its background is described in connection with current methods of forming electrical connections to perovskite materials, as an example.

The increasing density of integrated circuits (e.g. DRAMs) is increasing the need for materials with high-dielectric-constants to be used in electrical devices such as capacitors. Generally, capacitance is directly related to the surface area of the electrode in contact with the capacitor dielectric, but is not significantly affected by the electrode volume. The current method generally utilized to achieve higher capacitance per unit area is to increase the surface area/unit area by increasing the topography, such as in trench and stack capacitors using $SiO_2$ or $SiO_2/Si_3N_4$ as the dielectric. This approach becomes very difficult in terms of manufacturability for devices such as the 256 Mbit and 1 Gbit DRAMs.

An alternative approach is to use a high permittivity dielectric material. Many perovskite, pyroelectric, ferroelectric, or high-dielectric-constant (hereafter abbreviated HDC) materials such as $(Ba,Sr)TiO_3$ (BST) usually have much larger capacitance densities than standard $SiO_2$—$Si_3N_4$—$SiO_2$ capacitors. Various metals and metallic compounds, and typically noble metals such as Pt and conductive oxides such as $RuO_2$, have been proposed as the electrodes for these perovskite dielectric materials. To be useful in electronic devices, however, reliable electrical connections should generally be constructed which do not diminish the beneficial properties of these perovskite dielectric materials.

SUMMARY OF THE INVENTION

As used herein, the term "high-dielectric-constant" means a dielectric constant greater than about 50 at device operating temperature. As used herein the term "perovskite" means a material with a perovskite or perovskite-like crystal structure. As used herein the term "dielectric", when used in reference to a perovskite, means a non-conductive perovskite, pyroelectric, ferroelectric, or high-dielectric-constant oxide material. The deposition of a perovskite dielectric usually occurs at high temperature (generally greater than about 500° C.) in an oxygen containing atmosphere. The lower electrode structure should be stable during this deposition, and both the lower and upper electrode structures should be stable after this deposition.

It is herein recognized that there are several problems with the materials thus far chosen for the lower electrode in thin-film (generally less than 5 um) applications; many of these problems are related to semiconductor process integration. For example, Pt has several problems as a lower electrode which hinder it being used alone. Pt generally allows oxygen to diffuse through it and hence typically allows neighboring materials to oxidize. Pt also does not normally stick very well to traditional dielectrics such as $SiO_2$ or $Si_3N_4$, and Pt can rapidly form a silicide at low temperatures. A Ta layer has been used as a sticking or buffer layer under the Pt electrode, however during BST deposition, oxygen can diffuse through the Pt and oxidize the Ta and make the Ta less conductive. This may possibly be acceptable for structures in which contact is made directly to the Pt layer instead of to the Ta layer, but there are other associated problems as described hereinbelow. For example, Pt has a radioactive isotope, Pt-190, that, even though it has a relatively long half-life and makes up a small percentage of the total number of Pt atoms, could create a substantial number of detrimental alpha-particles when used in a standard thin-film structure.

Conductive oxides such as $RuO_2$ have been proposed as the lower (and upper) electrode. Although Ru is generally not a standard integrated circuit manufacturing material, Ru/$RuO_2$ can be used to provide an oxygen barrier between the underlying materials and the perovskite dielectric material. $RuO_2$ will generally not reduce the perovskite dielectric material, and can possibly be used as an oxygen source for the perovskite dielectric material.

Other structures which have been proposed include alloys of Pt, Pd, Rh as the electrode and oxides made of Re, Os, Rh and Ir as the sticking layer on single crystal Si or poly-Si. A problem with these electrodes is that these oxides are generally not stable next to Si and that these metals typically rapidly form silicides at low temperatures (generally less than about 450° C.). In addition, elements such as Pt can normally diffuse quickly in Si and therefore can cause other problems.

One problem with these solutions is that an electrode surface with a crystal structure and lattice parameters different than that of a perovskite dielectric appears to degrade the properties of the perovskite dielectric. For example, the spontaneous polarization of a ferroelectric (e.g. lead zirconium titanate (PZT)) deposited on an $RuO_2$ electrode is generally degraded compared to that of a Pt electrode. The reduced polarization may be caused by the different crystal structure and lattice parameters between PZT and $RuO_2$ as compared to PZT and Pt.

As an example, PZT commonly forms an undesirable pyrochlore crystal structure prior to the formation of the perovskite crystal structure. To facilitate perovskite crystal formation, perovskite dielectrics such as PZT have been deposited on some conductive perovskites such as $YBa_2Cu_3O_{7-x}$ and $(La,Sr)CoO_3$. Deposition of PZT on a substrate with a perovskite or perovskite-like crystal structure normally minimizes the formation of the pyrochlore phase and improves the properties of the perovskite dielectric. However, the materials used thus far for the deposition surface have several problems. For example, they typically involve new cations such as Cu and Co which are fairly reactive. These materials are also generally difficult to etch. In addition, these materials must be deposited in the stoichiometric ratio, and this deposition is generally difficult.

Generally, the present invention uses a conductive perovskite-seed layer between a conductive oxide layer and a perovskite dielectric material, wherein the perovskite-seed layer and the conductive oxide layer each comprise the same metal. The metal should be conductive in its metallic state and should remain conductive when partially or fully oxidized, and when in a perovskite. Generally, the perovskite-seed layer has a perovskite or perovskite-like crystal structure and lattice parameters which are similar to the perovskite dielectric layer formed thereon. At a given deposition temperature, the crystal quality and other properties of the perovskite dielectric will generally be enhanced by depositing it on a surface having a similar crystal structure. Undesirable crystal structure formation will generally be minimized and lower processing temperatures may be used to deposit the perovskite dielectric layer. Another benefit of this electrode system is that the perovskite-seed layer should do little or no reduction of the perovskite dielectric layer.

The disclosed structures generally provide electrical connection to perovskite dielectric materials while eliminating many of the disadvantages of the current structures. One embodiment of this invention comprises a conductive oxide layer comprising a first metal, a conductive perovskite-seed layer comprising the first metal overlaying the conductive oxide layer, and a perovskite dielectric layer overlaying the perovskite-seed layer. The similar crystal structure of the perovskite-seed layer improves the crystal quality of the perovskite dielectric layer and minimizes the formation of non-perovskite crystal structures. A method of forming an embodiment of this invention comprises forming a conductive oxide layer comprising a first metal, forming a conductive perovskite-seed layer comprising the first metal on the conductive oxide layer, and forming a perovskite dielectric layer on the perovskite-seed layer.

Another method of forming an embodiment of this invention comprises forming a conductive oxide layer having a top surface and side surfaces and comprising a first metal. A selectively reactive layer is formed on the conductive oxide layer and then the selectively reactive layer and the conductive oxide layer are heated, thereby causing the selectively reactive layer and the conductive oxide layer to react and form a perovskite seed layer on the conductive oxide layer. The perovskite seed layer comprises the first metal. Any unreacted portions of the selectively reactive layer are removed, and a perovskite dielectric layer is formed on the perovskite seed layer.

These are apparently the first thin-film structures wherein an electrical connection to a perovskite dielectric material comprises a perovskite-seed layer between a conductive oxide layer and the perovskite dielectric, wherein the perovskite-seed layer and the conductive oxide layer each comprise the same metal. These structures may also be used for single or multilayer capacitors and other thin-film devices such as non-volatile memories, thin-film piezoelectric and thin-film electro-optic devices.

BRIEF DESCRIPTION OF THE DRAWINGS

The novel features believed characteristic of the invention are set forth in the appended claims. The invention itself, however, as well as other features and advantages thereof, will be best understood by reference to the detailed description which follows, read in conjunction with the accompanying drawings, wherein:

DETAILED DESCRIPTION OF THE PREFERRED EMBODIMENTS

Figure 1:
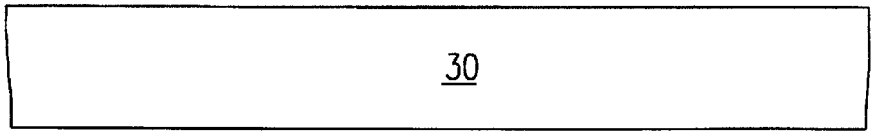
FIGS. 1, 2, 3, 4, 5 and 6 are cross-sectional views showing the progressive steps in the fabrication of a microelectronic structure in which a perovskite dielectric layer is deposited on an electrode comprising a perovskite-seed layer.
Figure 2:
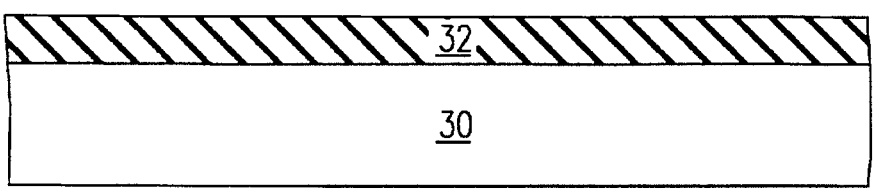
Figure 3:
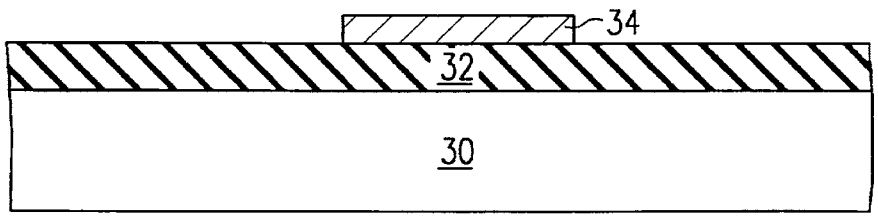
Figure 4:
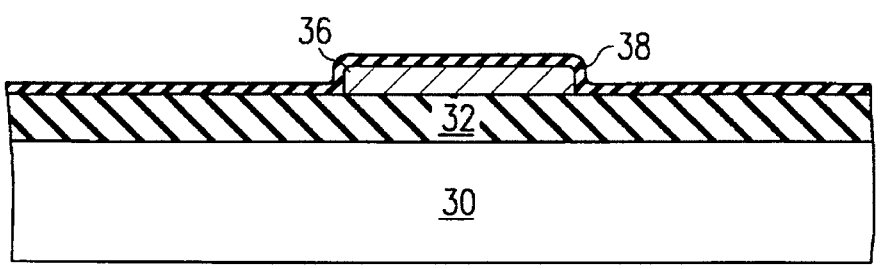
Figure 5:
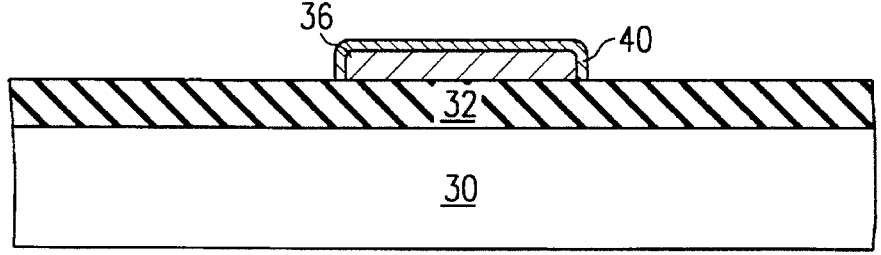

With reference to FIGS. 1–6, there is shown a method of forming a preferred embodiment of this invention, a microelectronic structure comprising a perovskite-seed layer between a conductive oxide layer and a perovskite dielectric, wherein the perovskite-seed layer and the conductive oxide layer each comprise the same metal. FIG. 1 illustrates a silicon semiconductor substrate 30. FIG. 2 illustrates an $SiO_2$ insulating layer 32 formed on the surface of the silicon substrate 30. FIG. 3 illustrates a patterned layer of ruthenium 34 deposited on the $SiO_2$ layer 32. The ruthenium layer 34 is subsequently oxidized to form ruthenium dioxide layer 36, which will function as the base of the lower electrode, as shown in FIG. 4. Ruthenium is conductive from its unoxidized state through its partially oxidized state to its fully oxidized state. The thickness of ruthenium dioxide layer 36 can vary depending on the application; a typical range would be 50 to 100 nanometers (nm).

FIG. 4 further illustrates a thin layer of calcium oxide 38 deposited on the surface of ruthenium dioxide layer 36 and on the exposed surface of $SiO_2$ layer 32. The structure is then heated, causing a solid state reaction between the CaO 38 and the surface of $RuO_2$ layer 36 to form the $CaRuO_3$ perovskite seed layer 40. $CaRuO_3$ layer 40 would generally be less than 50 nm thick, typically less than 30 nm thick, and preferably 10 to 20 nm thick. The thickness and stoichiometry of $CaRuO_3$ layer 40 is determined by how much CaO is deposited for layer 38 and by the processing temperature and time, and not by the deposition process. CaO layer 38 should be at least thick enough to form $CaRuO_3$ layer 40 of the desired thickness. More CaO than is necessary can be deposited; if a partial reaction occurs, a mild wet etch such as hot deionized water can be used to dissolve the unreacted CaO on $CaRuO_3$ layer 40, along with the portion of CaO layer 38 overlaying $SiO_2$ layer 32, yielding the structure of FIG. 5.

Selective chemical reactivity is generally desirable for CaO layer 38, so that it reacts with $RuO_2$ layer 36 and not with other materials which it contacts. To this end, a barrier layer such as $Si_3N_4$ may be used between CaO layer 38 and $SiO_2$ layer 32 to minimize the formation of silicates for example. Alternatively, a carbonate such as $CaCO_3$ may be used instead of CaO since $CaCO_3$ is generally less reactive.

These are apparently the first methods wherein an electrical connection to a perovskite dielectric material is formed by using a selectively reactive layer. This layer reacts with an underlying barrier layer to form a perovskite seed layer on the barrier layer, and then the excess portions of the selectively reactve layer are removed.

Although using very different materials and structures, this technique is similar to that used for the formation of platinum silicide or the formation of titanium nitride/titanium silicide/silicon ohmic contacts, wherein two layers of materials are caused to interact and form a third layer, with the unreacted material subsequently being removed. By using a layer that is selectively reactive to the conductive oxide layer, patterning is generally not needed to deposit the selectively reactive layer. Even though this process could possibly take more steps than a process in which the perovskite seed layer is deposited directly, it is generally easier and simpler to perform, since the perovskite seed layer is self-aligned and no removal of portions of the perovskite seed layer is necessary. The unreacted portions of the selectively reactive layer can be removed with a selective, but unpatterned etch.

Figure 6:
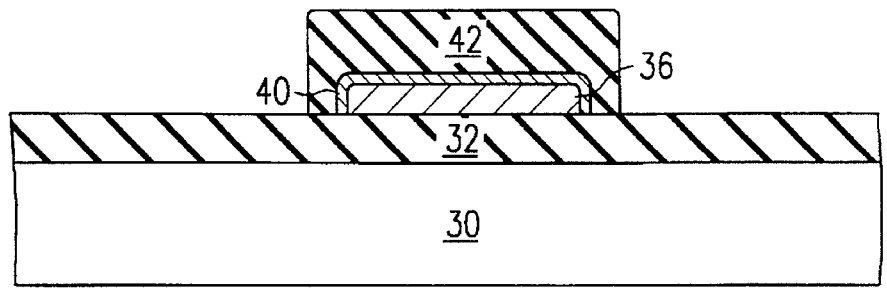

FIG. 6 illustrates a perovskite dielectric, BST layer 42, deposited on $CaRuO_3$ layer 40. At a given deposition temperature, the crystal quality and other properties of BST layer 42 will generally be enhanced by depositing it on the surface of $CaRuO_3$ layer 40 due to the similarity in crystal structure. As will be described in other alternate embodiments, an upper electrode may be deposited on BST layer 42.

Figure 7:
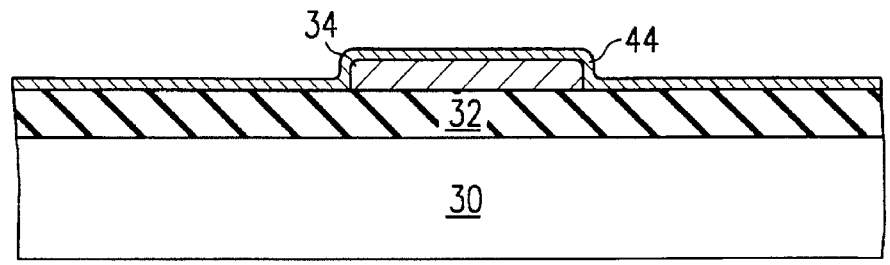
FIG. 7 is a cross-sectional view of a microelectronic structure comprising two metal layers that will be oxidized to form a perovskite-seed layer and a conductive oxide layer.

There are many alternative ways to form the $CaRuO_3$ perovskite-seed layer. In an alternate embodiment, FIG. 7 illustrates the structure of FIG. 3 but with a thin calcium layer 44 deposited on ruthenium layer 34. The calcium is then oxidized and in doing so reacts with the surface of ruthenium layer 34 to form a layer of $CaRuO_3$. The excess calcium is then removed, yielding the structure of FIG. 5.

Figure 8:
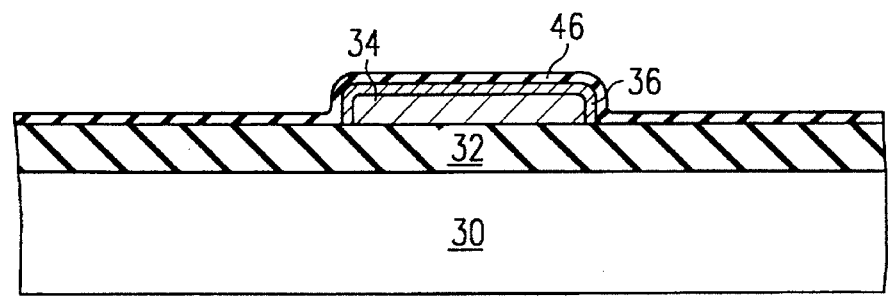
FIG. 8 is a cross-sectional view of a microelectronic structure comprising a metal-deficient layer overlaying a conductive oxide layer.

In another alternate embodiment, FIG. 8 illustrates a deposited ruthenium layer 34 with its surface oxidized to form ruthenium dioxide layer 36. A layer of Ru deficient $CaRu_{1-x}O_z$ 46 is then sputtered on the structure. $CaRu_{1-x}O_z$ layer 46 may be deposited on the entire structure or on ruthenium dioxide layer 36 only, using a mask. The structure is then annealed in oxygen to form a near stoichiometric layer of $CaRuO_3$ as the Ru deficient $CaRu_{1-x}O_z$ reacts with the ruthenium dioxide. If necessary, excess material is removed, again yielding the structure of FIG. 5.

Figure 9:
FIG. 9 is a cross-sectional view of a perovskite-seed layer overlaying a conductive oxide layer.
Figure 10:
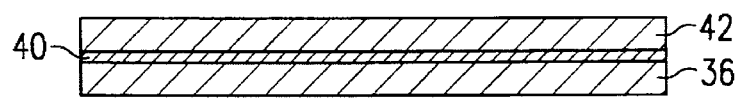
FIG. 10 is a cross-sectional view of a perovskite dielectric overlaying the structure of FIG. 9.

In another alternate embodiment, FIG. 9 illustrates a layer of $CaRuO_3$ 40 overlaying a layer of $RuO_2$ 36, and FIG. 10 illustrates a layer of BST 42 deposited on CaRuO₃ layer 40. The crystal quality and other properties of BST layer 42 are enhanced by depositing it on the surface of CaRuO₃ layer 40, which has a similar crystal structure.

Figure 11:
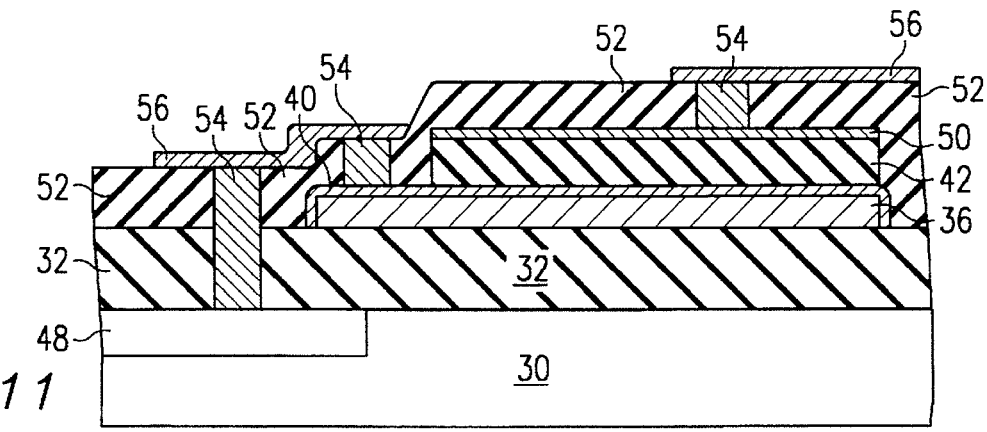
FIGS. 11–13 are cross-sectional views of capacitors having a perovskite dielectric layer overlaying an electrode comprising a perovskite-seed layer.

In another alternate embodiment, FIG. 11 illustrates a perovskite HDC capacitor utilizing an electrode comprising a perovskite-seed layer. BST layer 42 overlays the CaRuO₃ perovskite-seed layer 40, which in turn overlays RuO₂ layer 36. A TiN upper electrode 50 overlays BST layer 42. TiN is generally a good sticking layer and diffusion barrier, in addition to being conductive. In this embodiment, conductive CaRuO₃ layer 40 is connected to from above, via a conductive TiN plug 54. The TiN plug 54 makes electrical contact to the aluminum top metallization 56 through the second SiO₂ insulating layer 52. The two other TiN plugs 54 make electrical contact from the aluminum top metallization layer 56 to the TiN upper electrode 50 and to the doped silicon region 48.

Figure 12:
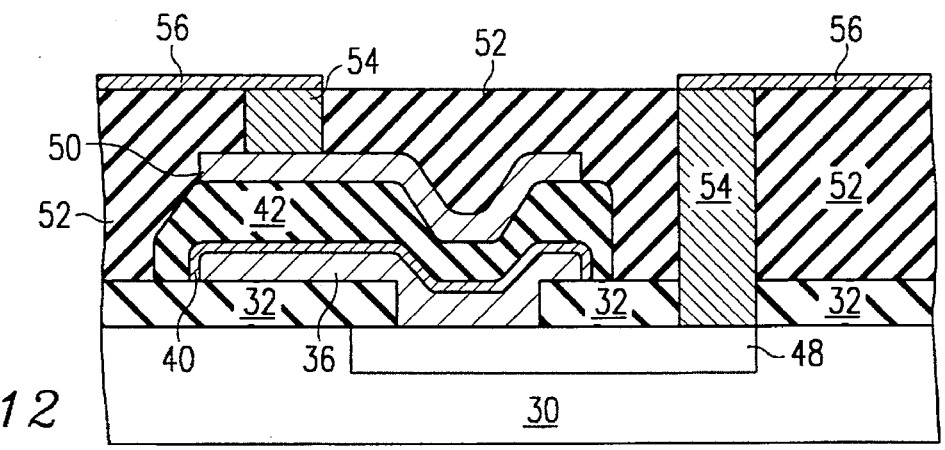

In another alternate embodiment, FIG. 12 illustrates a perovskite HDC capacitor utilizing an electrode comprising a perovskite-seed layer. As in FIG. 11, the CaRuO₃ perovskite-seed layer 40 is again formed on RuO₂ layer 36. However, in FIG. 12, RuO₂ layer 36 provides electrical connection to doped silicon region 48 below it.

Figure 13:
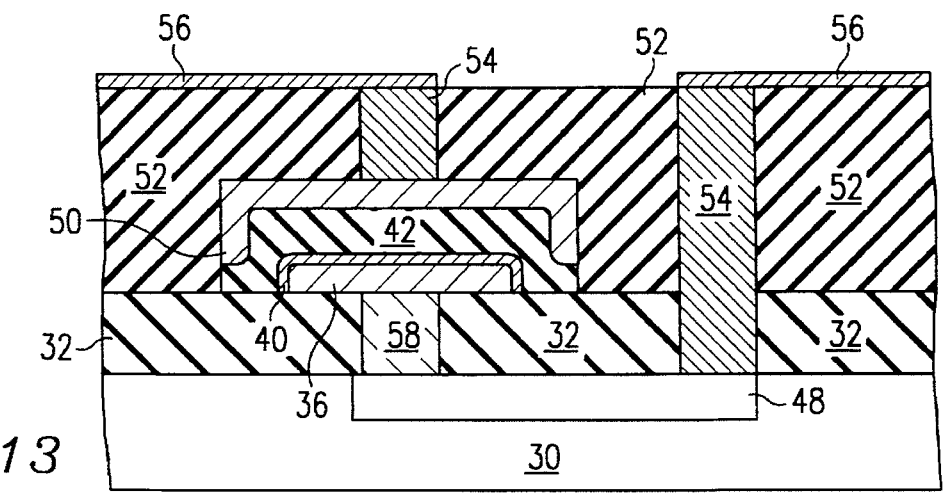

In yet another alternate embodiment, FIG. 13 illustrates a perovskite HDC capacitor utilizing an electrode comprising a perovskite-seed layer. As in FIG. 12, RuO₂ layer 36 is used for electrical contact. However, in FIG. 13, RuO₂ layer 36 connects to the doped silicon region 48 via a TiN plug 58.

The sole Table, below, provides an overview of some embodiments and the drawings.

TABLE

| Drawing Element | Preferred or Specific Examples | Generic Term | Other Alternate Examples |
|---|---|---|---|
| 30 | Silicon | Substrate | Other single component semiconductors (e.g. germanium, diamond) Compound semiconductors (e.g. GaAs, InP, Si/Ge, SiC) Ceramic substrates |
| 32 | Silicon dioxide | First level insulator | Other insulators (e.g. silicon nitride) May be more than one layer (e.g. Si₃N₄ barrier over SiO₂) Combinations of the above materials |
| 34 | Ruthenium | First metallic layer | Other metals (e.g. iridium) |
| 36 | Ruthenium oxide | Conductive oxide | Other conductive oxides (e.g. iridium oxide) May contain some unoxidized or partially oxidized metal |
| 38 | Calcium oxide | Selectively reactive layer | Other oxides or carbonates (e.g. calcium carbonate, strontium oxide, barium oxide, strontium carbonate, barium carbonate) |
| 40 | Calcium ruthenate | Perovskite-seed layer | Other conductive perovskites or perovskite-like materials (e.g. CaIrO₃, SrRuO₃, SrIrO₃, BaRuO₃, BaIrO₃) |
| 42 | Barium strontium titanate | Perovskite dielectric layer | Other perovskite, pyroelectric, ferroelectric, or high-dielectric-constant oxides (e.g. (Ba,Sr,Pb)(Ti,Zr)O₃, (Pb,La)(Zr,Ti)O₃, bismuth titanate, potassium tantalate, lead scandium tantalate, lead niobate, potassium niobate, lead zinc niobate, lead magnesium niobate) |
| 44 | Calcium | Second metallic layer | Other metals (e.g. barium, strontium) |
| 46 | CaRu₁₋ₓOᵤ | Metal-deficient layer | Other metal deficient compounds (e.g. BaRu₁₋ₓOᵤ, SrRu₁₋ₓOᵤ) |
| 48 | Doped silicon | Conductive semiconductor material | Semiconductor devices |
| 50 | Titanium nitride | Upper electrode | Other conductive metal compounds (e.g. nitrides: ruthenium nitride, tin nitride, zirconium nitride; oxides: ruthenium dioxide, tin oxide, titanium oxide, TiON, zinc oxide, doped zinc oxide, iridium oxide; silicides: titanium silicide, |

TABLE-continued

| Drawing Element | Preferred or Specific Examples | Generic Term | Other Alternate Examples |
|---|---|---|---|
| | | | tantalum silicide, tungsten silicide, molybdenum silicide, nickel silicide; carbides tantalum carbide; borides: titanium boride) Noble or platinum group metals (e.g. platinum, palladium, rhodium, gold, iridium, silver) Reactive metals (e.g. tungsten, tantalum, titanium, molybdenum) Other common semiconductor electrodes (e.g. aluminum, doped Si or Ge) Combinations of the above materials May contain more than one layer |
| 52 | Silicon dioxide | Second level insulator | Other insulators (e.g. silicon nitride) |
| 54 | Titanium nitride | Conductive plug | Other reactive metal compounds (e.g. nitrides: zirconium nitride; silicides: titanium silicide, tantalum silicide, tungsten silicide, molybdenum silicide nickel silicide; carbides: tantalum carbide; borides: titanium boride) Single component semiconductors (e.g. single- or poly-crystalline silicon, germanium) Reactive metals (e.g. tungsten, tantalum, titanium, molybdenum) Conductive carbides and borides (e.g. boron carbide) Aluminum, copper Compound semiconductors (e.g. GaAs, InP, Si/Ge, SiC) |
| 56 | Aluminum | Top metallization | Other common semiconductor electrodes (e.g. silicides, TiN) Two or more layers of metal and dielectric |
| 58 | Titanium nitride | Capacitor plug | Other reactive metal compounds (e.g. nitrides: zirconium nitride; silicides: titanium silicide, tantalum silicide, tungsten silicide. molybdenum silicide, nickel silicide, cobalt silicide; carbides: tantalum carbide; borides: titanium boride) Single component semiconductors (e.g. single- or poly-crystalline silicon, germanium) Reactive metals (e.g. tungsten, tantalum, titanium, molybdenum) Conductive carbides and borides (e.g. boron carbide) Compound semiconductors (e.g. GaAs, InP, Si/Ge, SiC) May be multiple layers (e.g. TiN/TiSi$_x$/poly-Si) Combinations of the above materials |

Many thin-film applications such as dynamic random access memories (DRAMs) require a small leakage-current-density in addition to a large capacitance per unit area. Specifically, it appears that the leakage current is controlled by Schottky barriers, thus the structures of the present invention may have a larger leakage current compared with Pt electrodes due to the smaller work function. Although the leakage current is important for DRAMs, it is generally not critical for other applications such as non-volatile memories and pyroelectric detectors.

The capacitor plug may comprise multiple layers, with an upper portion overlying the first level insulator and underlying the first conductive oxide (or the first metallic layer if used). The capacitor plug, and especially the upper portion, may comprise still other materials than those listed in the table yet which may be preferred for various applications. For example, the lower electrode base may comprise ternary (or greater) amorphous nitrides (e.g. Ta—Si—N, Ti—Si—N, Ta—B—N, Ti-B-N); exotic (non-standard Si processing) conductive nitrides (e.g. Zr nitride, Hf nitride, Y nitride, Sc nitride, La nitride and other rare earth nitrides, N deficient Al nitride, doped Al nitride, Mg nitride, Ca nitride, Sr nitride, Ba nitride); alloys of the above exotic conductive nitrides with common Si processing materials such as TiN, GaN, Ni nitride, Co nitride, Ta nitride, W nitride (e.g. Ta—Al—N, Ti—Al—N); or noble metal insulator alloys (e.g. Pd—Si—N, Pt—Si—N, Pd—Si—O, Pd—Si—O, Pd—B—(O,N), Pd—Al—N, Ru—Si—(O,N)).

A few preferred embodiments have been described in detail hereinabove. It is to be understood that the scope of the invention also comprehends embodiments different from those described, yet within the scope of the claims. With reference to the structures described, electrical connections to such structures can be ohmic, rectifying, capacitive, direct or indirect, via intervening circuits or otherwise. Implementation is contemplated in discrete components or fully integrated circuits in silicon, germanium, gallium arsenide, or other electronic materials families. In general the preferred or specific examples are preferred over the other alternate examples. For some drawing elements, the preferred or specific example and/or the other alternate examples may be used individually or combinations thereof may be used. The perovskite-seed layer may sometimes be referred to as being part of the electrode and may sometimes be referred to as being an interface to the electrode; the structures and methods of the present invention are substantially the same in either case. The conductive oxide layer (such as $RuO_2$) can also contain unoxidized or partially oxidized forms of the metal (such as Ru or RuO).

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method of forming a microelectronic structure, said method comprising:
   (a) forming a conductive oxide layer comprising a first metal;
   (b) forming a conductive perovskite-seed layer comprising said first metal on said conductive oxide layer; and
   (c) forming a perovskite dielectric layer on said perovskite-seed layer, whereby the similar crystal structure of the perovskite-seed layer improves the crystal quality of the perovskite dielectric layer and minimizes the formation of non-perovskite crystal structures.

2. The method according to claim 1, wherein said first metal is ruthenium and said conductive oxide is ruthenium dioxide.

3. The method according to claim 1, wherein said first metal is iridium and said conductive oxide is iridium oxide.

4. The method according to claim 1, wherein said perovskite-seed layer is calcium ruthenate.

5. The method according to claim 1, wherein said perovskite-seed layer is selected from the group consisting of $SrRuO_3$, $BaRuO_3$, $CaIrO_3$, $SrIrO_3$, and $BaIrO_3$.

6. The method according to claim 1, said method further comprising forming an upper electrode on said perovskite dielectric layer.

7. The method according to claim 1, said method further comprising forming said conductive oxide layer on a first metallic layer.

8. The method according to claim 7, wherein said first metallic layer comprises ruthenium.

9. The method according to claim 1, wherein said conductive oxide layer further comprises unoxidized and partially oxidized forms of said first metal.

10. The method according to claim 1, wherein said step of forming said conductive oxide comprises forming a first metallic layer and then partially or fully oxidizing said first metallic layer.

11. The method according to claim 10, wherein said conductive oxide is ruthenium dioxide and said first metallic layer is ruthenium.

12. The method according to claim 1, wherein said step of forming said perovskite-seed layer comprises forming a selectively reactive layer on said conductive oxide layer and then heating said selectively reactive layer and said conductive oxide layer.

13. The method according to claim 12, wherein said selectively reactive layer is selected from the group consisting of calcium oxide, strontium oxide, barium oxide, calcium carbonate, strontium carbonate, barium carbonate, and combinations thereof.

14. The method according to claim 12, wherein said step of forming said perovskite-seed layer further comprises removing any unreacted portions of said selectively reactive layer.

15. The method according to claim 14, wherein said unreacted portions are removed with a wet etch of deionized water.

16. The method according to claim 1, wherein said step of forming said perovskite-seed layer comprises forming a metal-deficient layer on said conductive oxide layer and then annealing said metal-deficient layer and said conductive oxide layer in an oxygen atmosphere.

17. The method according to claim 16, wherein said metal-deficient layer is ruthenium-deficient calcium ruthenate.

18. The method according to claim 1, wherein said step of forming said conductive oxide and said step of forming said perovskite-seed layer are performed in a combined step, said combined step comprising:
   forming a first metallic layer;
   forming a second metallic layer on said first metallic layer; and
   exposing said first and second metallic layers to oxygen, thereby converting said second metallic layer and a top portion of said first metallic layer into a perovskite-seed layer, and converting an underlying portion of said first metallic layer into a conductive oxide layer.

19. The method according to claim 18, wherein said first metallic layer is ruthenium, said second metallic layer is calcium, said conductive oxide is ruthenium dioxide, and said perovskite-seed layer is calcium ruthenate.

20. A method of forming a microelectronic structure, said method comprising:

(a) forming a conductive oxide layer having a top surface and side surfaces, said oxide layer comprising a first metal;

(b) forming a selectively reactive layer on said conductive oxide layer;

(c) heating said selectively reactive layer and said conductive oxide layer, thereby causing said selectively reactive layer and said conductive oxide layer to react and form a perovskite seed layer on said conductive oxide layer, said perovskite seed layer comprising said first metal;

(d) removing any unreacted portions of said selectively reactive layer; and (e) forming a perovskite dielectric layer on said perovskite seed layer.

21. A method of forming a microelectronic structure, said method comprising:

(a) forming a ruthenium layer having a top surface and side surfaces;

(b) oxidizing said top surface and side surfaces to form a ruthenium dioxide layer;

(c) forming a calcium oxide layer on said ruthenium dioxide layer;

(d) heating said calcium oxide layer and said ruthenium dioxide layer, thereby causing said calcium oxide layer and said ruthenium dioxide layer to react and form a calcium ruthenate layer on said ruthenium dioxide layer;

(e) removing any unreacted portions of said calcium oxide layer with deionized water; and (c) forming a barium strontium titanate layer on said calcium ruthenate layer.

* * * * *